United States Patent [19]

Nilsson

[11] Patent Number: 5,058,445
[45] Date of Patent: Oct. 22, 1991

[54] IRREVERSIBLE SCREW AND NUT DRIVING DEVICE

[75] Inventor: Sven W. Nilsson, Partille, Sweden

[73] Assignee: SKF Nova AB, Sweden

[21] Appl. No.: 301,924

[22] Filed: Feb. 27, 1989

Related U.S. Application Data

[63] Continuation of Ser. No. 76,760, Jul. 23, 1987, abandoned.

[30] Foreign Application Priority Data

Aug. 11, 1986 [SE] Sweden .............................. 8603372

[51] Int. Cl.$^5$ .............................................. F16H 57/06
[52] U.S. Cl. .................................. 74/89.15; 74/411.5;
74/424.8 R; 192/8 C
[58] Field of Search ............ 74/89.15, 411.5, 412 TA,
74/424.8 R; 192/8 C

[56] References Cited

U.S. PATENT DOCUMENTS

| | | | |
|---|---|---|---|
| 2,953,934 | 9/1960 | Sundt | 74/424.8 R |
| 3,110,380 | 11/1963 | Meyer et al. | 192/8 C |
| 3,269,199 | 8/1966 | Deehan et al. | 74/89.15 |
| 3,304,796 | 2/1967 | Bird | 74/424.8 R |
| 3,449,978 | 6/1969 | Stimpson | 74/411.5 |
| 3,722,641 | 3/1973 | Kusiak | 192/8 C |
| 3,802,281 | 4/1974 | Clarke | 74/89.15 |
| 4,246,991 | 1/1981 | Oldakowski | 192/8 C |
| 4,557,156 | 12/1985 | Teramachi | 74/424.8 R |
| 4,623,051 | 11/1986 | Lochmoeller | 192/8 C |
| 4,644,811 | 2/1987 | Tervo | 74/424.8 R |

FOREIGN PATENT DOCUMENTS

| | | | |
|---|---|---|---|
| 679323 | 2/1964 | Canada | 74/424.8 R |
| 1076670 | 2/1984 | U.S.S.R. | 74/89.15 |

*Primary Examiner*—Leslie A. Braun
*Assistant Examiner*—Scott Anchell
*Attorney, Agent, or Firm*—Eugene E. Renz, Jr.

[57] ABSTRACT

In a screw and nut driving device with low internal friction, e.g. a ball nut mechanism, irreversibility is effected in a simple and efficient manner when the nut is rotatably driven and enclosed by an annular space in which a helical spring is arranged in such a manner that its ends are acted upon by the driving force from the external driving source, thus that the spring can rotate freely in the space. When the external driving source is disconnected and the nut, due to axial load is subjected to a torque, the ends of the spring are acted upon thus that the spring is deformed to friction locking against a non-rotating surface, whereby the nut is prevented from rotation.

3 Claims, 1 Drawing Sheet

IRREVERSIBLE SCREW AND NUT DRIVING DEVICE

This is a continuation of application Ser. No. 07/076,760 filed July 23, 1987, now abandoned.

FIELD OF THE INVENTION

The present invention relates to improvement in drive mechanisms commonly known as screw and nut driving devices.

BACKGROUND OF THE INVENTION

Screw and nut driving devices, which incorporate ball or roller nuts, i.e. where balls or rollers recirculate in grooves constituted by the nut and screw threads, have so small friction losses that they are not irreversible. Small friction losses are, of course, desirable from energy aspects, but non-irreversible devices are inappropriate from safety aspects in certain connections, e.g. in lifting devices. Different blocking and braking arrangements have earlier been proposed for solving this problem. They generally have been arranged in connection to the driving motor and they have locked or braked the output shaft of the motor, often in dependency of the energy supply to the motor, which is generally arranged for driving the screw thus that the nut without rotation is displaced along the screw, when this rotates. Rotation of the screw is, however, non-appropriate at rapid approach, as a long and slender screw ought to rotate at a lower speed than its critical speed. Locking and braking means between the motor and the screw increase the dimension of the device.

SUMMARY OF THE INVENTION

The purpose of the present invention is to provide a screw and nut driving device of the type defined in the preamble, with aid of which the approach can be carried out at a high speed and irreversibility can be brought about with simple means in direct connection to the nut.

To this end, in accordance with the present invention, the drive mechanism comprises an elongated screw member and nut member circumscribing the screw and an element displaceable along the screw which houses the nut and is driven by relative rotation of the nut and screw members. A helical spring mounted in an annular space between the nut member and element has ends which engage between first surface means on a member rotationally driven by the external driving force and a second surface means on the nut. The member is rotatable in a limited fashion relative to the element so that when the nut is driven by an external driving force, the spring can rotate freely in the space and when the nut due to an axial load is subjected to a torque by the element tends to deform the spring to friction lock against the surface associated with the element to prevent relative rotation of the nut and thereby define the non-reversibility function of the device.

Such a device can be made very compact, and a conventional driving system can be used for rotating the nut. Irreversibility in both rotation directions can easily be obtained with simple and inexpensive means.

BRIEF DESCRIPTION OF THE DRAWINGS

The invention hereinafter will be further described with reference to the accompanying drawing, in which.

DESCRIPTION OF THE PREFERRED EMBODIMENTS

Figure 1:
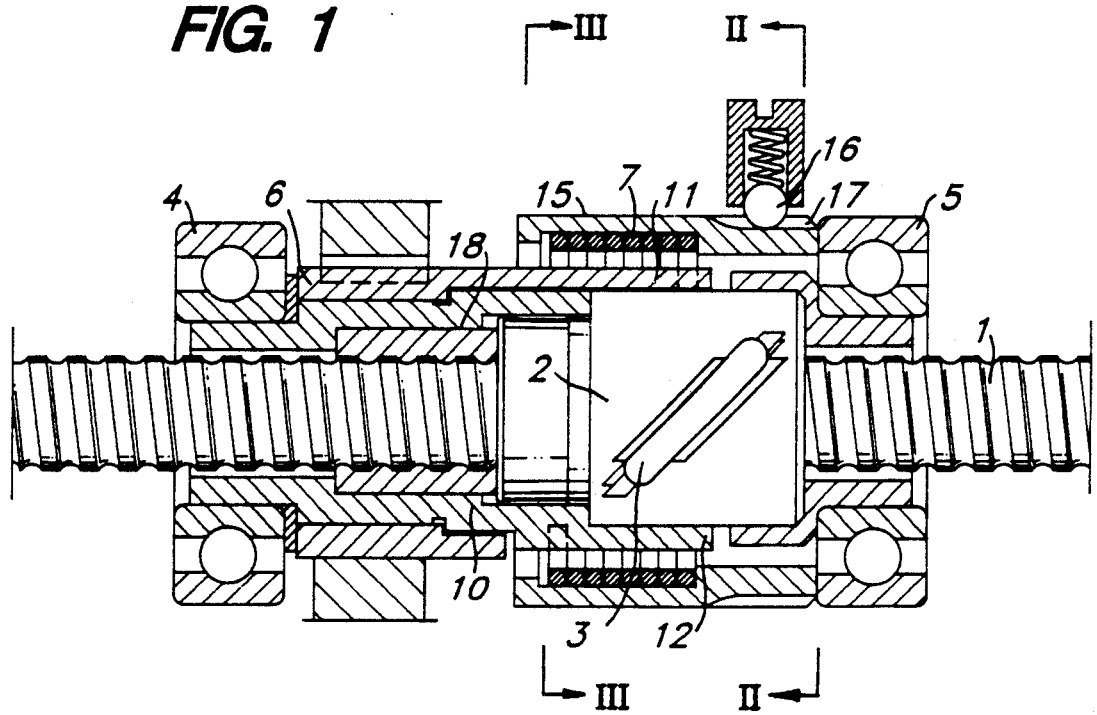
FIG. 1 shows a longitudinal section.
Figure 2:
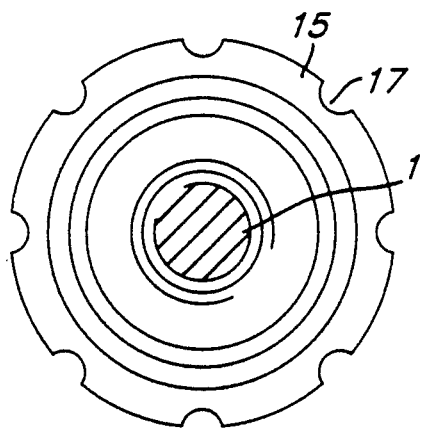
FIGS. 2 and 3 show cross sections along lines II—II and III—III in FIG. 1 of a device according to an embodiment of the invention.
Figure 3:
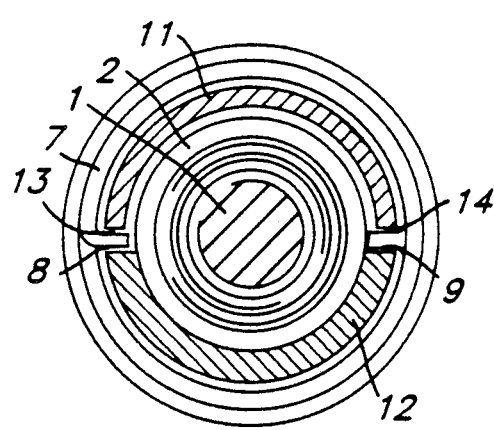

The device incorporates a screw in the form of a threaded rod 1, and a nut 2 enclosing the screw. The nut and the screw cooperate via a number of balls, which recirculate between the screw and the nut in grooves constituted by the screw and nut threads and a recirculation portion 3 arranged on the outside of the nut. The nut is arranged in a not further shown element, e.g. a load carrier in a lifting device, which element is displaceable along the screw and is driven by the relative rotation of the nut and the screw. The nut is supported in the element in two ball bearings 4, 5, the outer race rings of which are arranged in seats in the element and the inner race rings of which enclose sleeves in which the nut is arranged. A sleeve 6 is connected to a not shown driving member, e.g. an electric motor arranged upon the element, which is displaceable along the screw, with which driving member the sleeve and thereby the nut can be rotated about the non-rotating screw in the non-rotating element, which at rotation of the nut is displaced along the screw.

A helical spring 7 is arranged in an annular space between the nut and the element. The ends 8, 9 of the spring are so located that they, when the nut is driven by an external driving source via the sleeve 6, are acted upon by the driving force thus that the spring can rotate freely in the space and that, when the nut, due to axial load on the element, is subjected to a torque, without being driven by the external driving source, are acted upon by the nut thus that the spring is deformed to frictional locking against a surface connected to the element and delimiting the space for the spring, whereby the nut is prevented from rotation relative to the element.

In the embodiment shown this is obtained in that the sleeve 6 is rotatably supported upon a further sleeve 10 and that the sleeves have one mainly semi-circular portion 11, 12 each, which portions project into the space housing the helical spring, whereby each one of the helical spring ends are bent into one slot 13, 14 between the different ends on the portions 11, 12, thus that the ends of the spring have a certain play in the circumferential direction of the slots. The sleeve 10 is rigidly fitted to the nut 2, and when the sleeve 6 is rotated by an external driving source, the portion 11 will be pressed against one 8, 9 of the spring ends, thus that the spring tends to reduce its circumference, whereby it can rotate freely in the space. The spring end is then pressed against an end surface on the portion 12, thus that the sleeve 10 and thereby the nut 2 are brought to rotate. If, however, the sleeve 6 is not acted upon by any external driving source but is disconnected, and the nut 2 instead exerts a turning moment upon the sleeve 10, e.g. by being loaded in the longitudinal direction of the screw 1 by a load from a load carrier, the portion 12 will be pressed against one of the spring ends 8, 9 thus that the spring tends to increase its circumference, whereby it contacts a surface delimiting the space and being connected to the element. Thereby the device will be frictionally locked, whereby the nut is prevented from rotating relative to the screw 1. The device is, thus, irreversible although it incorporates a ball nut mechanism having low friction against the screw.

The surface against which the spring 7 engages at locking forms preferably a cylindrical wall in a bore in a sleeve 15, which is rotatably arranged in a seat in the element, which is displaceable along the screw 1. The rotation of the sleeve 15 is locked by an excess load catch in the form of a spring loaded ball 16, which is pushed into one of several recesses 17 about the circumference of the sleeve 15. At a certain torque, the ball is pressed out of the recess and the sleeve can be rotated, whereby it is ascertained that the device is not subjected to too large loads. The moment carrying ability must, of course, fulfill all safety requirements.

In order to maintain the connection between the nut and the screw, even if the recirculating balls should fall out of the track, a safety nut 18 is arranged in connection to the nut 2. The safety nut is provided with thread, which cooperates directly with the thread of the screw 1 and is, in normal operation, non-loaded.

Due to the location of the spring 7 around the nut 2, a compact and space-saving arrangement is achieved. The rather big diameter of the spring means that the friction force between spring and sleeve 15 gives a big braking moment.

What is claimed is:

1. The combination comprising an elongated threaded rod member (1) and a nut member (2) adapted for axial movement upon relative rotation of said threaded rod member (1) and said nut member (2), first and second sleeve members (6, 10) in circumscribing overlying relation to one another and said threaded rod member (1), said first and second sleeve members (6, 10) mounted for limited rotational movement relative to one another, an outer braking sleeve member (15) spaced radially from said first and second sleeve members (6, 10) to define an annular space for a helical spring (7) having radially directed ends (8, 9), said first sleeve member (6) rotatable by an external drive means and said second sleeve member (10) driveably connected to said nut member (2), said first and second sleeve members (6, 10) having respective first and second axially projecting portions (11, 12) which cooperatively circumscribe said nut member (2) and having confronting edges defining a pair of slots (13, 14) within which the radially directed ends (8, 9) of said helical spring (7) project, a first rotation of said first sleeve member (6) by said drive means causing contraction of said helical spring (7) by engagement of said first portion (11) with said radially directed ends (8, 9) of said helical spring (7) thereby permitting rotation of said nut member (2) through said second portion (12), disengagement of the drive means and an axial load on said nut member (2) tending to cause a second rotation of said second sleeve member (10) through said nut member (2), said second rotation causing said second portion (12) to engage one of said radially directed ends (8, 9) expanding said helical spring (7) into braking contact with said braking sleeve (15) thereby preventing relative rotation of said nut member (2) and said threaded rod member (1).

2. The combination comprising an elongated threaded rod member (1) and a nut member (2) adapted for axial movement upon relative rotation of said threaded rod member (1) and said nut member (2), first and second sleeve members (6, 10) in circumscribing overlying relation to one another and said threaded rod member (1), said first and second sleeve members (6, 10) mounted for limited rotational movement relative to one another, an outer braking sleeve member (15) spaced radially from said first and second sleeve members (6, 10) to define an annular space for a helical spring (7) having radially directed ends (8, 9), said spring (7) at least partially circumscribing said nut member (2), said first sleeve member (6) rotatable by an external drive means and said second sleeve member (10) driveably connected to said nut member (2), said first and second sleeve members (6, 10) having respective first and second axially projecting portions (11, 12) which cooperatively circumscribe said nut member (2) and having confronting edges defining a pair of slots (13, 14) within which the radially directed ends (8, 9) of said helical spring (7) project, a first rotation of said first sleeve member (6) by said drive means causing contractions of said helical spring (7) by engagement of said first portion (11) with said radially directed ends (8, 9) of said helical spring (7) thereby permitting rotation of said nut member (2) through said second portion (12), disengagement of the drive means and an axial load on said nut member (2) tending to cause a second rotation of said second sleeve member (10) through said nut member (2), said second rotation causing said second portion (12) to engage one of said radially directed ends (8, 9) expanding said helical spring (7) into braking contact with said braking sleeve (15) thereby preventing relative rotation of said nut member (2) and said threaded rod member (1).

3. The combination comprising an elongated threaded rod member (1) and a nut member (2) adapted for axial movement upon relative rotation of said threaded rod member (1) and said nut member (2), first and second sleeve members (6, 10) in circumscribing overlying relation to one another and said threaded rod member (1), said first and second sleeve members (6, 10) mounted for limited rotational movement relative to one another, an outer braking sleeve member (15) spaced radially from said first and second sleeve members (6, 10) to define an annular space for a helical spring (7) having radially directed ends (8, 9), said spring (7) at least partially circumscribing said nut member (2), said first sleeve member (6) rotatable by an external drive means and said second sleeve member (10) driveably connected to said nut member (2), said first and second sleeve members (6, 10) having respective first and second axially projecting portions (11, 12) which cooperatively circumscribe said nut member (2) and having confronting edges defining a pair of slots (13, 14) within which the radially directed ends (8, 9) of said helical spring (7) project, a first rotation of said first sleeve member (6) by said drive means causing contraction of said helical spring (7) by engagement of said first portion (11) with said radially directed ends (8, 9) of said helical spring (7) thereby permitting rotation of said nut member (2) through said second portion (12), disengagement of the drive means and an axial load on said nut member (2) tending to cause a second rotation of said second sleeve member (10) through said nut member (2), said second rotation causing said second portion (12) to engage one of said radially directed ends (8, 9) expanding said helical spring (7) into braking contact with said braking sleeve (15) thereby preventing relative rotation of said nut member (2) and said threaded rod member (1), and a safety overload means (16, 17) normally preventing rotation of said outer braking sleeve member (15) when said external drive means exerts a torque below a predetermined level upon said first sleeve member (6).

* * * * *